United States Patent [19]
James

[11] Patent Number: 4,796,437
[45] Date of Patent: Jan. 10, 1989

[54] MULTIFLUID HEAT PUMP SYSTEM

[76] Inventor: Larry S. James, 1749 Mount Ephraim Rd., Adamstown, Md. 21710

[21] Appl. No.: 111,635

[22] Filed: Oct. 23, 1987

[51] Int. Cl.$^4$ ................................................ F25B 7/00
[52] U.S. Cl. ...................................... 62/79; 62/238.6; 62/238.7
[58] Field of Search ................ 62/238.6, 324.4, 238.7, 62/79

[56] References Cited

U.S. PATENT DOCUMENTS

| | | | |
|---|---|---|---|
| 4,399,664 | 8/1983 | Derosier | 62/238.6 X |
| 4,514,990 | 5/1985 | Sulkowski | 62/238.7 |
| 4,528,822 | 7/1985 | Glamm | 62/238.7 |

Primary Examiner—Lloyd L. King
Attorney, Agent, or Firm—Solon B. Kemon

[57] ABSTRACT

An economical heat pump system which uses a multifluid heat exchanger and the basic components of conventional heat pump systems including, as appropriate, a desuperheat exchanger. The invention may be operated in two conventional refrigerant flow configurations including heat pump space heating and cooling and simultaneous hot water heating via the desuperheater. The use of a multifluid heat exchanger allows the two refrigerant flow configurations to have nine operational modes. In one flow configuration the refrigerant is from the compressor, through the desuperheater, through a reversing valve, through the outdoor heat exchanger, through an expansion device, through the indoor heat exchanger and back to the compressor via the reversing valve. In the second configuration, the refrigerant flow is from the compressor, through the desuperheater, through the reversing valve, through the indoor heat exchanger, through an expansion device, through the outdoor heat exchanger and back to the compressor. In the four basic operational modes associated with the two refrigeration flow configurations (e.g. Space heating, space cooling and simultaneous hot water heating in each of these modes) the refrigerant desuperheater is used to heat water when needed. Additional modes made available by the use of the multifluid heat exchanger include, dedicated liquid heating or liquid chilling and space heating or space cooling utilizing heated or chilled liquid as the heat source or sink respectively. Finally, a defrost mode of the outdoor heat exchanger without affecting the condition of an indoor space by utilizing heat supplied from a stored previously heated (e.g. economically heat pump heated) liquid via the multifluid heat exchanger to evaporate the refrigerant in the defrost flow configuration.

6 Claims, 5 Drawing Sheets

MULTIFLUID HEAT PUMP SYSTEM

BACKGROUND OF THE INVENTION

The present invention relates generally to the art of refrigeration. More particularly, this invention is directed to the modification of a basic heat pump system to additionally accomplish the heating or cooling of a liquid, such as hot water for domestic use or chilled water for off peak cooling. With still more particularity, the present invention relates to an air-to-air or water-to-air heat pump capable of conventional space heating or cooling, heating or cooling a liquid and in which heat for defrost of the outdoor heat exchanger is capable of being supplied entirely from stored previously heated liquid. The present invention is capable of space heating or cooling, utilizing heated or chilled liquid as the heat source or sink. Finally this invention relates to a heat pump system capable of (1) space cooling or (2) space heating, or full capacity, (3) liquid heating or (4) chilling without affecting the condition of an indoor space or (5) simultaneous space cooling and liquid heating, or (6) simultaneous space heating and liquid heating, or (7) defrosting the outdoor coil with a previously heated liquid, or (8) space heating or (9) space cooling using heated or chilled liquid.

The use of heat pumps to provide heated or cooled air to an interior space dependent on refrigerant flow path is well known. The basic elements of such systems include a compressor, an indoor heat exchanger, an outdoor heat exchanger and refrigerant expansion devices. Such heat pump systems are used to heat interior spaces by directing refrigerant from the compressor to be condensed in the indoor heat exchanger, then through an expansion device to the outdoor heat exchanger where the refrigerant is evaporated and directed to the compressor. The system may be used to cool the indoor space by redirecting the flow of refrigerant in the cycle such that the indoor heat exchanger is the evaporator and the outdoor heat exchanger is the condenser. Furthermore, it is known that heat pumps may be used to heat water for hot water storage systems.

One disadvantage, inherent in the operation of air-to-air heat pump systems relates to the build up of frost on the outdoor heat exchanger coil when indoor space heating is called for in the heating season and outdoor ambient conditions are conducive to the buildup of frost on the outdoor coil as heat is extracted from the ambient. When conditions are conducive to frost buildup, moisture is precipitated out of the cool air being drawn over and through the outdoor coil at the coil surface where it solidifies in the form of frost or ice. The build up of frost insulates the heat exchanger coil with the result that the heat exchange capability of the coil is degraded and the ability of the heat pump circuit to deliver heat to heat water and/or a conditioned space suffers markedly. The need for timely and effective defrost of the outdoor coil naturally follows.

A common method of defrosting the outdoor coil in a heat pump circuit is known as reverse cycle defrost which entails reversing the operation of the heat pump system from the space heating mode to the space cooling mode of operation.

The effect of such mode reversal is to direct the hot gas discharged by the compressor within the system directly to the outdoor coil as normally occurs in the space cooling mode, as opposed to directing hot gas to the indoor heat exchanger as normally occurs in the space heating mode. During periods of space heating the indoor coil acts as a condenser and the outdoor coil as the evaporator with the result that heat from the hot refrigerant gas discharged from the compressor is given up to the indoor space while heat is extracted from the outdoor ambient for ultimate use indoors. In current reverse cycle defrost schemes i.e., when a heat pump is shifted to what would normally be a space cooling mode, heat is given up to the outdoor coil, which functions as a condenser, and melts the frost buildup on the coil. Since the indoor coil functions as an evaporator in reverse cycle defrost modes it extracts heat from its surroundings i.e., the heated indoor space. The extraction of heat and the lowering of the temperature of the indoor space is clearly an undesirable result and has previously required the energization of a supplemental heat source, such as electrical resistance heaters or a furnace, while the heat pump system is in the defrost mode. The net result of the use of such supplemental heating is the defrost of the outdoor coil at a coefficient of performance of approximately 1.0. Such supplemental heat is significantly more expensive than the heat provided by the heat pump system just as is the electrical resistance heat utilized to heat water in conventional water heating systems. The three medium heat exchanger provides a direct thermal link between the evaporating refrigerant in the indoor heat exchanger and the previously heated liquid thereby allowing a liquid heated defrost cycle.

Another disadvantage, inherent in the operation of heat pump systems, relates to their inability to meet the total space heating needs during low outdoor ambient temperature conditions. The most common method of supplementing the heating capacity of the heat pump at reduced ambient temperature is the energization of a supplemental heat source, as in the defrost mode, such as electrical heaters or a furnace while the heat pump operates below the space heating balance point. The use of supplemental heating at a coefficient of performance of approximately 1.0 reduces the efficiency of the heat pump system but more particularly requires the electrical utility to meet undesirable peak demands.

In order to provide a more economical system, as well as to conserve energy usage, a number of combined systems have been proposed to provide space heating or cooling, either alone or in conjunction with water heating, or water heating alone. (i.e., U.S. Pat. No. 4,598,557 to Robinson). Another system includes the capability of defrosting the outdoor coil using only stored previously heated liquid as a heat source (i.e., U.S. Pat. No. 4,646,537 to Crawford).

A need still exists in the field of integrated heat pumps for an economical and practical system. The prior art requires complex refrigerant circuits with multiple refrigerant control valves. Major electrical utility studies indicate that a practical load managed heated or chilled water storage system can be introduced into the advanced heat pump design if the design concept is based on the integration of year round domestic hot water heating. A need therefore exists for an integrated heat pump capable of year round domestic hot water heating and utilizing a stored liquid as the source or sink for directly heating or cooling the conditioned space or indirectly, through the refrigerant circuit, defrosting the outdoor coil.

SUMMARY OF THE INVENTION

The present invention is a heat pump and integrated liquid circuit capable of (1) space cooling or (2) space heating, or full capacity, (3) liquid heating or (4) chilling without affecting the condition of an indoor space or (5) simultaneous space cooling and liquid heating, or (6) simultaneous space heating and liquid heating, or (7) defrosting the outdoor coil with a previously heated liquid, or (8) space heating or (9) space cooling using heated or chilled liquid to supplement or supplant that provided by the refrigerant circuit. The refrigerant circuit includes a refrigerant compressor, an indoor heat exchanger including; a closed liquid filled path in thermal contact with refrigerant carrying conduits of the heat exchanger and air movement means; an outdoor fan-coil arrangement; a refrigerant-liquid heat exchanger; two conventional refrigerant expansion devices and a reversing valve. The liquid circuit includes means for pumping liquid through the refrigerant-liquid heat exchanger and/or the closed liquid filled path integrated into the multifluid heat exchanger; to and from a liquid storage tank, such as a domestic hot water heater, and the selective valving necessary to route the liquid through the system components in accordance with the particular operational mode called for. Beyond these essential elements, this invention may include variable speed indoor and outdoor fans, variable speed pump and a variable speed compressor motor to provide optimal refrigerant, air and water mass flow rates and resulting capacity modulation.

The invention may be operated in two refrigerant flow configurations, with nine associated operational modes. In one configuration, the refrigerant flows from the compressor, through the refrigerant-to-liquid desuperheater, through a reversing valve, through the outdoor heat exchanger, through an expansion device, through the multifluid indoor heat exchanger and back to the compressor. Five operational modes can occur in this configuration: (1) cooling the indoor air alone; (2) heating water while cooling the indoor air; (3) heating the evaporating refrigerant while defrosting the outdoor heat exchanger; (4) chilling water to be used later for off peak cooling; and (5) cooling indoor air during off peak hours with previously cooled chilled water or providing supplemental cooling during peak cooling loads.

In the second configuration the refrigerant flow is from the compressor, through the desuperheater heat exchanger, through the reversing valve, through the multifluid indoor heat exchanger, through the expansion device, through the outdoor heat exchanger and back to the compressor. Four operational modes can occur in this configuration: (6) heating the interior space; (7) heating domestic water while heating the indoor space; (8) heating domestic water alone in full condensing; and (9) heating indoor air during off peak hours with previously heated water or providing supplemental heat during peak heating loads. In the various heating and cooling modes the flow of hot water through the liquid filled path of the multifluid indoor heat exchanger and the refrigerant desuperheater is controlled so that superheat is removed in the desuperheater and condensing when required is accomplished in the multifluid heat exchanger depending on the water temperature and operational mode.

Therefore, it is an object of this invention to provide a heat pump system which provides space heating or space cooling alone or with water heating, water heating alone, water chilling and the defrosting of the outdoor heat exchanger utilizing previously heat water.

It is a further object of this invention to effect accelerated defrost of the outdoor coil by employing a heat source which is at a higher temperature than the temperature of the indoor air and which heat has been stored and/or is capable of being replaced at a coefficient of performance of greater than 1.0.

Finally another object of this invention is to provide a liquid circuit for indoor air heating and cooling during off peak hours or to supplement the heating or cooling capacity of the heat pump refrigerant circuit.

These and other objectives and advantages of the present invention will become apparent from the following description of the preferred embodiment and method and the accompanying drawings.

DESCRIPTION OF THE PREFERRED EMBODIMENT AND METHOD

Referring to FIGS. 1-7, which differ only in the position of selected valves and therefore illustrate different liquid and refrigerant flow paths. Compressor 10 has a discharge port 12 and a suction port 14. The refrigerant flow reversing means 18, first selectively actuated heat exchange means 20 which includes heat exchanger 22 and fan 24 and second selectively activated heat exchange means 26 which includes multifluid heat exchanger 26 with closed liquid filled path 28 in heat transfer relation to refrigerant conduit 30 and blower 32. The heat transfer medium, i.e., recirculated domestic hot water, circuit includes a selectively activated pump 34, selectively activated liquid diverter valves 36 and 38; liquid filled path 28 of multifluid heat exchanger 26, desuperheat exchanger 16, storage tank 40 which contains auxiliary heat source 42 and finally tempering valve 44. Desuperheat exchange means 16 in the preferred embodiment is a unit through which a liquid heat transfer medium, i.e., domestic hot water can be selectively pumped in heat exchange relationship with the refrigerant passing through said desuperheat exchange means. Heat exchanger means 20 is a unit through which outdoor air is drawn in a heat exchange relationship with refrigerant carrying conduit 22 when said heat exchange means is activated. Multifluid heat exchange means 26 is a unit through which indoor air can be blown in a heat exchange relationship with refrigerant carrying conduits 30 and heat transfer medium, i.e., domestic hot water closed liquid filled path 28 when said heat exchange means is activated. It is contemplated that the liquid pumped through the closed liquid filled path 28 of multifluid heat exchanger 26 and desuperheat exchange means 16 will be water circulated out of and back to a domestic water heater 40. A refrigerant reversing valve 18, two water diverter valves 36 and 38 and a hot water tempering valve 18 serve to direct the flow of refrigerant and water within the respective circuits. Additionally, two expansion valve/check valve combinations 46 and 48 are employed to selectively meter refrigerant to the heat exchange means 20 and 26 respectively. The use of pressure reducing devices other than expansion valves, such as capillary tubes or orifices is, of course, contemplated. Finally, storage tank 40 which is preferably a domestic hot water heater, is connected for flow with the closed liquid filled path 28 of multifluid heat exchange means 26 and/or desuperheat exchange means 16. As illustrated in the Figures, water is diverted by the hot water tempering valve 44 from either the bottom of the storage tank 40 during water heating operational modes or from the top of the tank during the supplemental space heating mode which use hot water as the heat source. During simultaneous water heating operational modes water is pumped from the bottom of the tank 40 by pump 34, through desuperheat exchange means 16 and returned to the top of storage tank 40. During full condensing water heating, water is pumped from the bottom of the tank 40 by pump 34, through the closed liquid filled path 28 of multifluid heat exchange means 26, through desuperheat exchange means 16 and returned to the top of tank 40. During supplemental space heating, water is diverted from the top of the tank 40 through tempering valve 44, pumped by pump 34, through the closed liquid filled path 28 of multifluid heat exchange means 26 and returned to the bottom of tank 40. Storage tank 40 will normally include auxiliary heat means 42 by which heat can be supplied to the stored liquid when the refrigerant circuit is unable to do so in part or in full.

As illustrated in the Figures, valves 18, 36, and 38 are solenoid operated valves. As will be immediately apparent to those skilled in the art, several other circuit configurations can readily be envisioned based upon teachings of this disclosure. Such configurations might include more or fewer valves of different types or capabilities as well as the conduit necessary to interconnect these valves. The choice of the type of valves and the number of parts in each valve is considered to be a matter of design choice and is likely to be driven by the economics of valve pricing and the price of refrigerant conduit.

Figure 8:
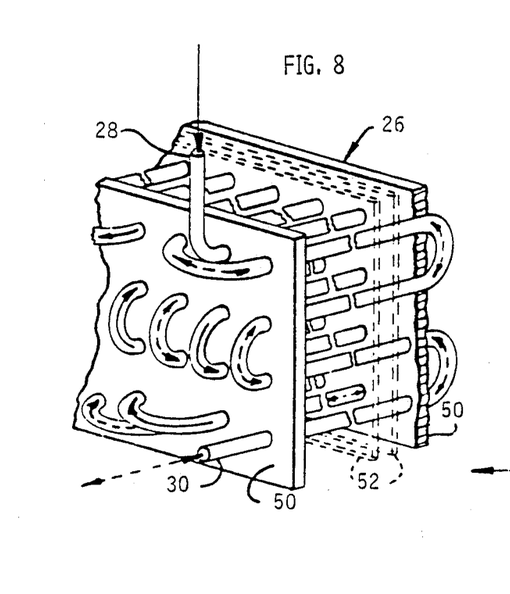
FIG. 8 is a partial frontal perspective view of a portion of a finned tube heat exchanger to better illustrate the manner in which the indoor coil of the heat pump and the coil of the heat storage medium are inter-positioned.
Figure 9:
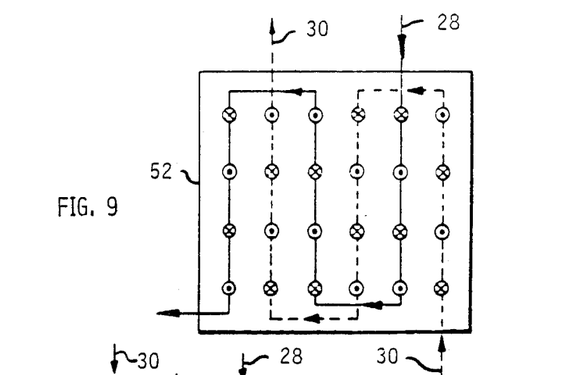
FIG. 9 is a hydraulic schematic representation of the heat exchanger to illustrate the manner of heat exchange flow through the separate coils forming the heat exchanger when the heat pump is in a heating mode.
Figure 10:
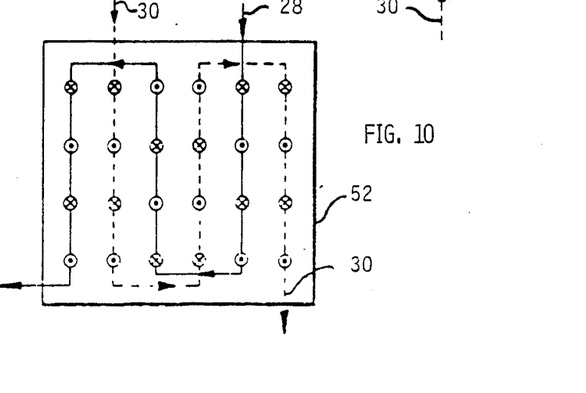
FIG. 10 is a hydraulic schematic representation of the heat exchange to illustrate the manner of heat exchanger fluid flow through the heat exchanger when the heat pump is in a cooling mode of operation.
Figure 11:
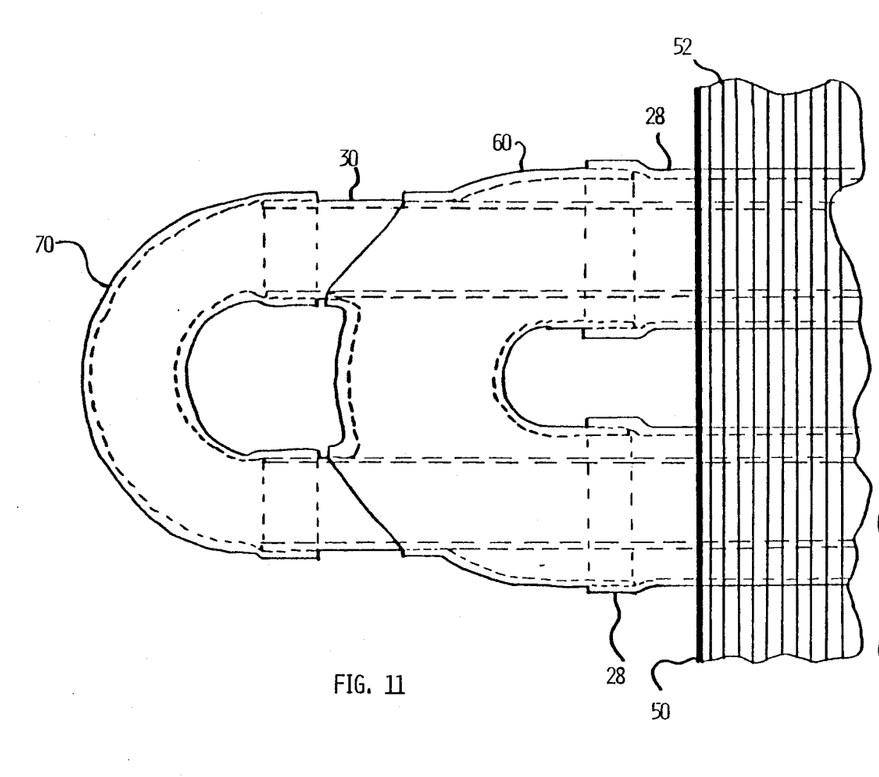
FIG. 11 is a detailed plan view of the typical return bend arrangement of an alternative, multi-circuited coaxial, multifluid heat exchanger which shows the outer tube return bend 60 and the inner return bend 70. Heat exchange fins 52 are also shown in this view.
Figure 12:
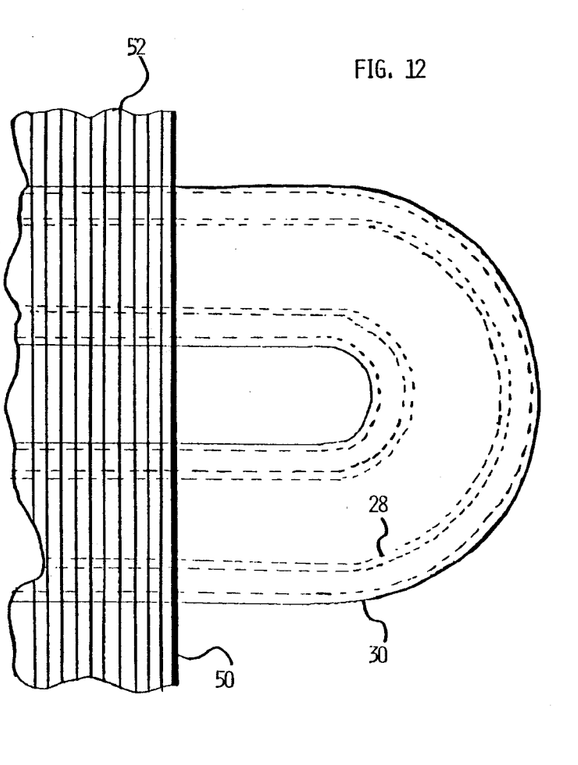
FIG. 12 is a detailed plan view similar to FIG. 11 which shows a typical hair pin end of the heat exchanger shown in FIG. 11. Again heat exchange fins 52 are also shown.

Referring to FIGS. 8–10, in order to transfer heat between and among an evaporating or condensing refrigerant, indoor ambient air and a circulating heat transfer fluid the heat exchanger 26, best illustrated by FIGS. 8, 9 and 10 is formed by interpositioning the indoor coil 30 of the heat pump with the water coil 28 coupled to the storage tank 40. The indoor coil 30 is passed between two tube sheets 50 and the refrigerant circulated through the coil in either direction (as indicated by the dashed arrow) depending upon the particular mode of operation of the heat pump to effect heating (FIG. 9) or cooling (FIG. 10) of the conditioned space. The water coil 28 is supported by the same two tube sheets 50 to circulate the water from the storage tank 40, as indicated by a solid arrow, through the water coil. The coils 30 and 28, are each supported by the tube sheets 50 in alternate vertical parallel planes and carry a plurality of common coil fins 52 throughout the length of the coils extending between the two tube sheets 50.

In order to transfer heat from the refrigerant circulated through the indoor coil 30 of the refrigerant circuit to the water circulated through the water coil 28, air flow from the blower 16 is reduced or stopped while the compressor 10 and water pump 34 are operating. As shown in FIG. 9, wherein the conventional flow symbols of ⊗ and ⊙ are used to indicate flow into and out from the plane of the figure, respectively, the flow path of the two heat exchange fluids will be in parallel. Heat will then be transferred from the outdoors to the heat storage medium for storage until such time as it is needed or for later use during time periods when energy costs for running the compressor 10 are at a higher level.

During cooling of the conditioned space or defrosting of the outdoor coil 22, the heat exchanger fluids are in counter-flow as illustrated by FIG. 10, where in the same flow symbols as shown in FIG. 9 are utilized. The refrigerant from the outdoor coil 22 and/or the water in the storage tank 40 are circulated through their respective coils 30 and 28 of the multifluid heat exchange means 26 under control of the control system. In the cooling mode, temperature of the water in the storage tank 40 is such that heat will be extracted from the conditioned space to the water, pump 34 is energized circulating water through the coil 28 while the blower 32 passes air through the multifluid heat exchange means 26 during higher energy cost time periods to supplement or supplant use of the refrigerant circuit and compressor 10. In cooling the storage medium, the blower 32 is again not operated to pass air through multifluid heat exchange means 26, but is deenergized while the heat exchange fluids are circulated through their respective coil 30 and 28, to transfer heat between the two mediums. In the outdoor coil 22 defrost mode utilizing stored previously heated liquid from the storage tank 40, if the defrost control calls for a defrost cycle to occur and the temperature of the water in the storage tank 40 is such that heat will be transferred from the water to the evaporating refrigerant, pump 34 is energized circulating water through the coil 28 while causing refrigerant to be evaporated in indoor coil 30 which is in heat transfer relationship with the water passing through water coil 28.

Again, similarly to transferring heat to the storage medium, heat can be extracted from the heat storage medium by the multifluid heat exchange means 26 during those times of day when energy rates for operating the compressor 10 are the lowest. Transferring heat from the storage tank 40 during low cost energy periods or below the heat pump thermal balance point allows the water to be circulated through the water coil 28 of the multifluid heat exchange means 26 to supplement or supplant use of the compressor 10 to heat the conditioned space. In extracting heat from the storage tank 40, the blower 32 is energized while water is circulated through water coil 28 to transfer heat from the water to the indoor air.

Additionally, heat exchange means 20 which is shown as an outdoor fan coil unit of an air-to-air heat pump system may be substituted by water or other heat transfer liquid, in which case the outdoor coil and fan unit will be replaced by a heat exchanger. The water or other heat transfer liquid may be supplied by a closed loop system where the liquid is heated or cooled by the ground after circulating through the heat exchanger. The heat transfer liquid may also be supplied by an external thermal source of such as a lake or pond.

OPERATIONAL MODES

Figure 1:
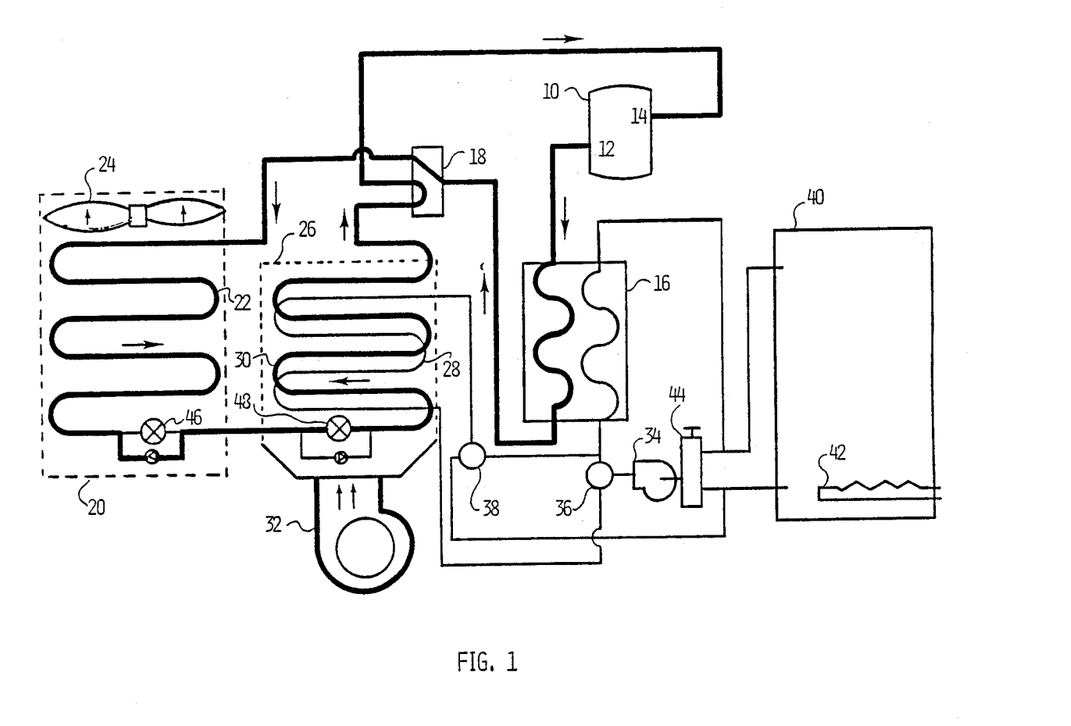
FIG. 1 is a schematic diagram of the present invention in the space cooling mode of operation.

In a first mode of operation the refrigerant circuit of the present invention achieves the cooling of a space utilizing ambient outdoor air as a heat sink. Referring to FIG. 1, in a space cooling mode compressor 10 discharges superheated gaseous refrigerant through desuperheat exchanger 16, through reversing valve 18 to the outdoor heat exchanger means 20. Fan 24 and therefore heat exchange means 20, is activated in this mode with the result that outdoor air is drawn through heat exchanger 22. The outdoor air acts to condense and cool the refrigerant gas passing through the heat exchanger. Condensed refrigerant passes out of heat exchange means 20, through check vavle portion of expansion valve combination 46 to the expansion valve portion of expansion valve combination 48. The condensed refrigerant is metered through the expansion valve portion of expansion valve combination 48 and into the refrigerant conduit of multifluid heat exchange means 26. Blower 32 is energized in the space cooling mode. Refrigerant entering heat exchanger conduit 30 of heat exchange means 26 is vaporized by the receipt of heat from the indoor air being blown through by blower 32. Refrigerant gas exiting heat exchange means 26 is directed back to compressor suction port 14 by reversing valve 18.

Figure 2:
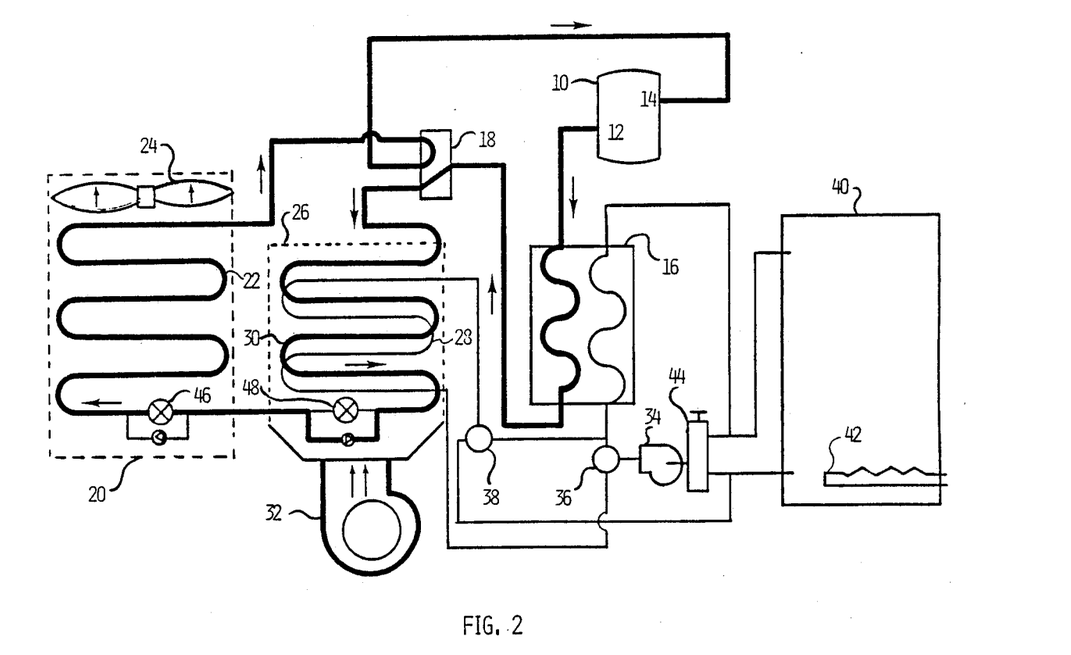
FIG. 2 is a schematic diagram of the present invention in the space heating mode of operation.

In a second mode of operation, the present invention achieves the heating of a space utilizing ambient outdoor air as a heat source. Referring to FIG. 2, in the space heating mode compressor 10 discharges superheated gaseous refrigerant through discharge port 12, through desuperheat exchanger 16, through reversing valve 18 to the refrigerant carrying conduit 30 of the multifluid heat exchange means 26. Blower 32 is activated, and therefore multifluid heat exchange means 26 is activated with the result that indoor air blown through heat exchange means 26 acts to condense the refrigerant gas passing there through. As a result, the indoor air passing across heat exchange means 26 is heated and the refrigerant passing through heat exchange means 26 gives up heat. Condensed refrigerant gas passes out of multifluid heat exchange means 26 through check valve portion of expansion valve combination 48 and to the expansion valve portion of expansion valve combination 46. The condensed refrigerant metered out of expansion valve combination 46 is directed into heat exchanger 22 of outdoor heat exchange means 20. Fan 24 of outdoor heat exchange means 20 is activated in this mode. Refrigerant entering heat exchanger 22 is vaporized by the receipt of heat from the outdoor air being drawn through heat exchanger 22 by fan 24. Refrigerant gas exiting outdoor heat exchange means 20 is directed back to the compressor suction port 14 by the reversing valve 18.

Figure 3:
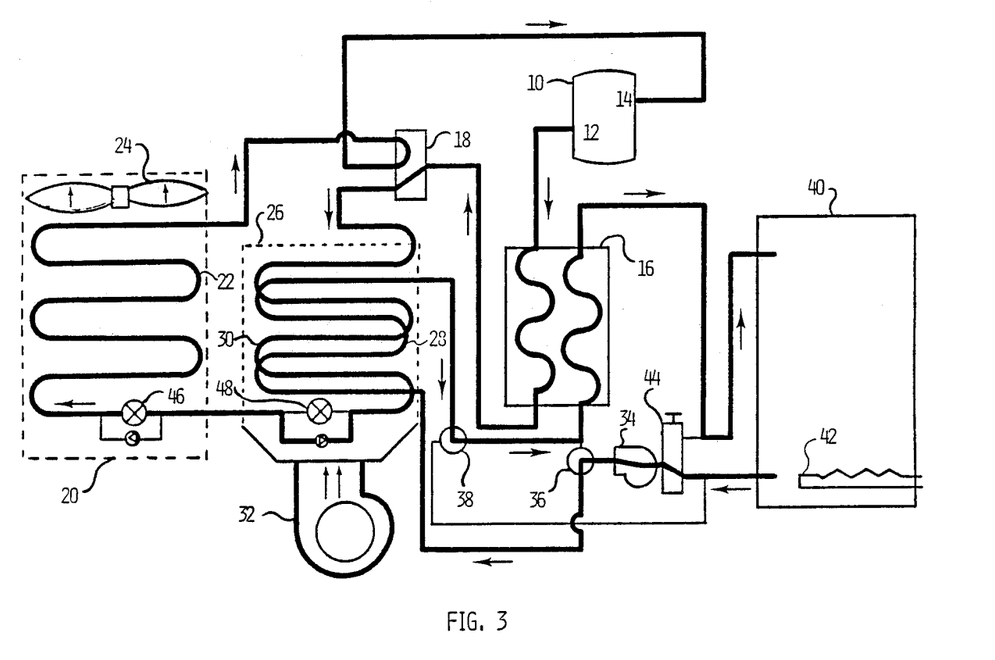
FIG. 3 is a schematic diagram of the present invention in the water heating mode of operation.

In a third mode of operation, the present invention achieves the heating of a liquid utilizing outdoor ambient air as a heat source. The condition of indoor space is not affected in this mode since indoor blower 32 is not activated. Referring to FIG. 3 in the liquid heating mode of operation compressor 10 discharges superheated gaseous refrigerant through desuperheat exchanger, through reversing valve 18 and in to refrigerant carrying conduits 30 of multifluid heat exchange means 26. Pump 34 and therefore multifluid heat exchange means 26 and desuperheat exchange means 16, is activated with the result that liquid circulated through heat exchange means 26 and 16 acts to condense the refrigerant gas passing therethrough. The circulated liquid is heated while the refrigerant gas is cooled. Condensed refrigerant gas passes out of multifluid heat exchange means 26 and through the check valve portion of expansion valve combination 48. The refrigerant is then metered through expansion valve combination 46 and is directed into outdoor heat exchange means 20. Fan 24 of heat exchange means 20 is activated in this mode. Refrigerant entering heat exchanger 22 of outdoor heat exchange means 20 is vaporized by the receipt of heat from the outdoor ambient air being drawn through heat exchanger 22 by fan 24. Refrigeration gas exiting outdoor heat exchange means 20 is finally directed back to compressor suction port 14 by reversing valve 18. In the liquid heating mode, indoor air is not blown through multifluid heat exchange means 26 by blower 32 which is inactive. The temperature of the indoor space is therefore unaffected during the liquid heating mode of operation. It is understood that chilling of a liquid utilizing outdoor ambient air as a heat sink is a fourth mode of operation.

Figure 4:
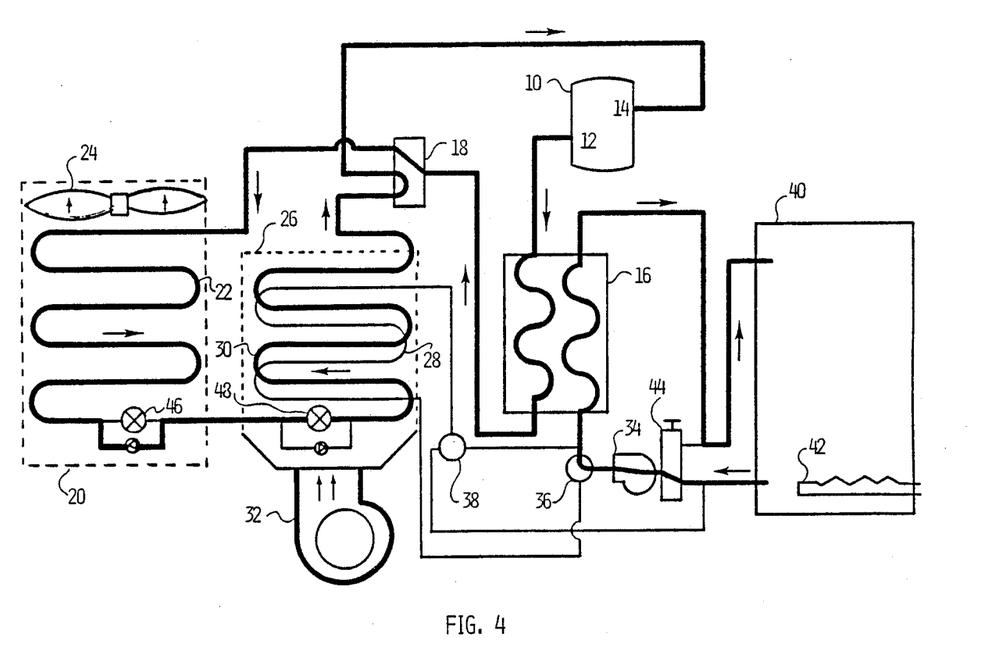
FIG. 4 is a schematic diagram of the present invention in the simultaneous space cooling-liquid heating mode of operation.

In a fifth mode of operation, the present invention achieves the simultaneous cooling of the space and heating of a liquid. Referring to FIG. 4 in the simultaneous space cooling-liquid heating mode, compressor 10 discharges superheated gaseous refrigerant through discharge port 12 through desuperheat exchange means 16. Pump 34, and therefore superheat exchange means 16, is activated with the result that the liquid circulating therethrough is heated and the refrigerant gas is cooled. Depending upon system operating system parameters, the superheated refrigerant is at least desuperheated and may be partially condensed within desuperheat exchange means 16. By limiting the heat exchange which occurs within desuperheat exchange means 16 in this mode so that the refrigerant is only desuperheated, as opposed to being condensed, system efficiency is enhanced. The still hot and probably superheated refrigerant passes out of desuperheat exchange means 16 through reversing valve 18 and to outdoor heat exchange means 20. Fan 24 of outdoor heat exchange means 20 is activated in this mode of operation with the result that refrigerant gives up additional heat to the outdoor air being drawn through heat exchanger 22. Condensed refrigerant exits the outdoor heat exchange means 20, passes through the check valve portion of the expansion valve combination 46 and enters expansion valve portion of expansion valve combination 48. The refrigerant is then metered through expansion valve combination 48 into refrigerant carrying conduit 30 of multifluid heat exchanger means 26. Refrigerant entering multifluid heat exchange means 26 is vaporized by the exchange of heat which occurs between the metered condensed refrigerant and the indoor air being blown through multifluid heat exchange means 26 by blower 32 which is activated. The vaporized refrigerant exits multifluid heat exchange means 26 and is directed back to the compressor suction port 14 by the reversing valve 18.

Figure 5:
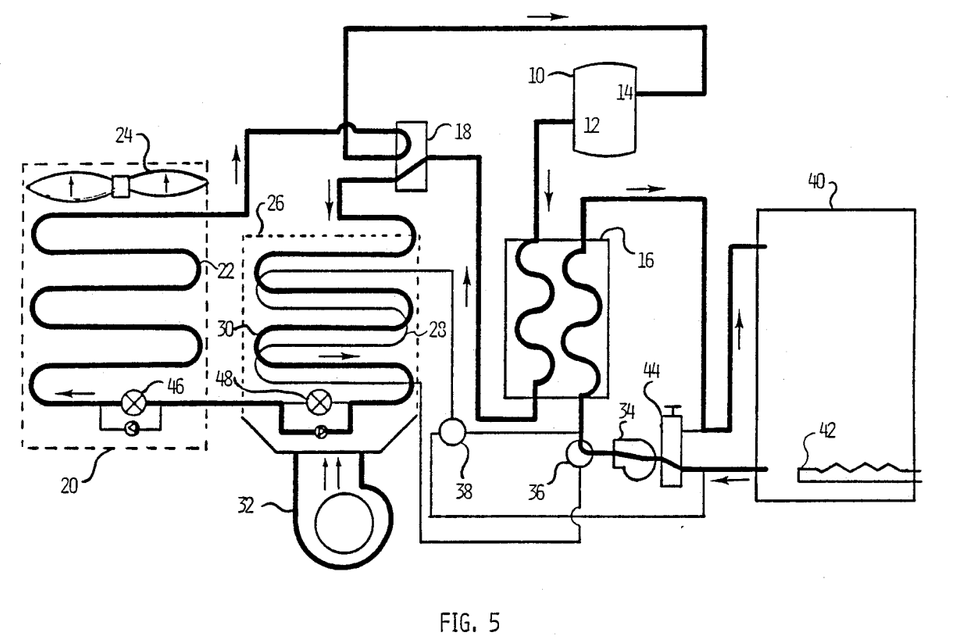
FIG. 5 is a schematic diagram of the present invention in the simultaneous space-liquid heating mode of operation.

In a sixth mode of operation the present invention achieves the simultaneous heating of a space and heating of a liquid. Referring to FIG. 5, in the simultaneous space heating-liquid heating mode compressor 10 discharges superheated gaseous refrigerant through discharge port 12 and through desuperheat exchange means 16. Pump 34, and therefore desuperheat exchange means 16, is activated with the result that the liquid circulated therethrough desuperheats the refrigerant also passing therethrough. The liquid circulated through desuperheat exchange means 16 is heated while the refrigerant is cooled. As in the fourth mode of operation, the superheated refrigerant supplied by the compressor may or may not be partially condensed in the desuperheat exchange means 16. Preferably, the gas will only be desuperheated so as to allow it to retain most of its heat content for space heating, which is likely the more important of the two heating functions of this mode. The refrigerant passes out of the desuperheat exchanger 16 through reversing valve 18 and passes into refrigerant carrying conduit 30 of multifluid heat exchange means 26. As the refrigerant passes through the refrigerant carrying conduit 30 in a heat exchange relationship with indoor air being blown therethrough by blower 32 the refrigerant condenses, giving up heat to the indoor air. The now-condensed refrigerant passes through the check valve portion of expansion valve combination 48, and into expansion portion of expansion valve combination 46. The refrigerant is next metered into outdoor heat exchange means 20 where it is vaporized in a heat exchange relationship with outdoor air being drawn through heat exchanger 22 under the impetus of fan 24. The vaporized refrigerant exits heat exchange means 20, passes through reversing valve 18 and is returned to the compressor suction port 14.

Figure 6:
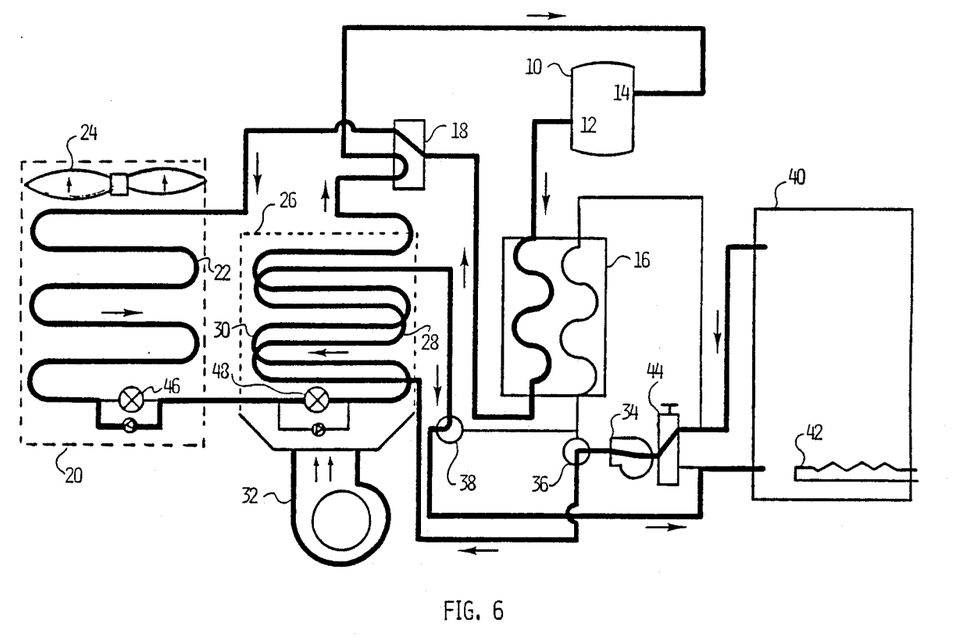
FIG. 6 is a schematic diagram of the present invention in the preferred defrost mode of operation in which only stored previously-heated liquid is employed to achieve defrost of the outdoor coil.

In the seventh mode of operation the present invention achieves the defrosting of heat exchanger 22 in outdoor heat exchange means 20 utilizing only stored previously-heated liquid as a heat source. Referring to FIG. 6, compressor 10 discharges hot refrigerant gas through discharge port 12, through desuperheat exchanger 16, through reversing valve 18 directly into heat exchanger 22 of outdoor heat exchange means 20. Fan 24 of outdoor heat exchange means 20 is not energized in this mode with the result that superheated refrigerant gas passes through heat exchanger 22 unaffected by other than the heat exchange relationship it undergoes with the frost formed on the exterior of heat exchanger 22. The energizing of fan 24 and drawing of outdoor air through heat exchanger 22 in a defrost mode is to be avoided as it would serve only to dissipate heat and inhibit the defrosting of heat exchanger 22. The refrigerant, after exiting heat exchanger 22, passes through the check valve portion of expansion valve combination 46 to expansion valve portion of expansion valve combination 48. Refrigerant passing through expansion valve combination 48 is directed into refrigerant carrying conduit 30 of multifluid heat exchanger means 26. Pump 34 and therefore closed liquid filled path 28 in heat transfer relationship with the refrigerant carrying conduit 30 of multifluid heat exchange means 26, is activated with the result that the liquid circulated therethrough vaporizes the refrigerant likewise passing therethrough. The use of a hot water tempering valve 44 to cause a counterflow of liquid with respect to the hot water temperature profile contained within the storage tank 40 is to be considered as it would enhance heat exchange therein and therefore the efficiency of the system in this mode of operation. The vaporized refrigerant passes out of the multifluid heat exchange means 26 and through reversing valve 18 prior to being delivered back to compressor suction port 14. In this defrost mode, which is the preferred and primary defrost mode of operation, indoor air is not directed through multifluid heat exchange means 26 by blower 32 which is inactive. The temperature of the indoor space is therefore unaffected by the defrost of heat exchanger 22 in outdoor heat exchange means 20.

Figure 7:
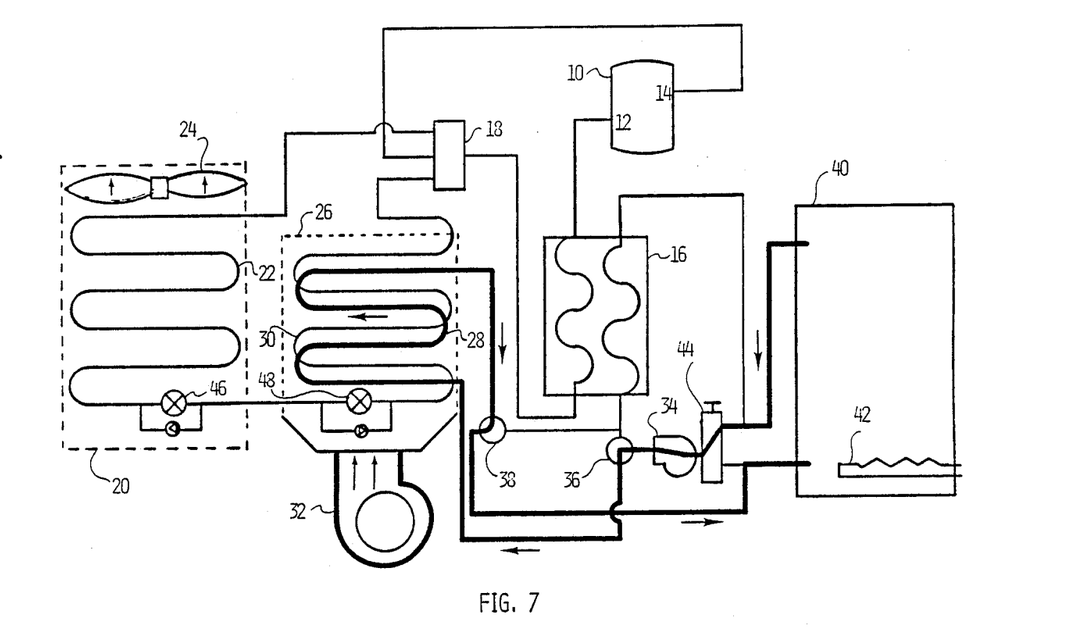
FIG. 7 is a schematic diagram of the present invention in the indoor air heating from stored previously-heated liquid.

In an eight mode of operation the present invention achieves the heating of a space utilizing a heated liquid as a heat source. Referring to FIG. 7, in the supplemental space heating mode pump 34 pumps a liquid (e.g. stored-previously heated domestic hot water) through diverter valve 44 into the closed liquid filled path 28 of multifluid heat exchange means 26. Indoor air is blown through multifluid heat exchanger 26 as blower 32 is energized. The circulated liquid is cooled while the indoor air is heated. The cooled liquid exists the multifluid heat exchanger 26 passes through diverter valve 38 and directed to the bottom of the storage tank 40. It is understood that a chilled liquid could be substituted for the heated liquid in an nineth mode of operation in which the present invention achieves the cooling of a space utilizing a chilled liquid as a heat sink.

The control of the present invention will be apparent to those skilled in the art and is not of particular concern. It is likely that electronic controls will be employed which are responsive to system operating parameters such as, but not limited to, outdoor ambient temperature, stored liquid temperature, and heat exchanger coil temperatures. Although an optimum control strategy may be accomplished most efficiently utilizing a microprocessor, the simplicity of the refrigerant and heat transfer liquid circuits allow the use of conventional solenoid actuated control system components. The refrigerant circuit includes only one active control element reversing valve 18 other than the compressor 10. The liquid circuit includes only two active control elements, diverter valves 36 and 38 other than the pump 34. The hot water tempering valve 44 is a passive control element which limits the maximum temperature of the liquid heat source during supplmental space heating and maintains an optimum tank supply and return flow configuration.

Other means for controlling the various heat transfer rates within and between the refrigerant and liquid circuits may include a variable speed fan 24, variable speed blower 32, variable speed pump 34 and finally a variable speed compressor 10. Any or all of these improved control elements may be used to optimize a control strategy for a given application of the present invention.

While the invention has been described in detail with particular reference to the preferred embodiment thereof, it will be understood that variations and modifications can be effected within the spirit and scope of the invention as previously described and as defined by the claims.

What is claimed is:

1. A method of heating or cooling an indoor space and/or heating or cooling a stored liquid comprising the steps of:

operating a heat pump to transfer heat between and among an indoor heat exchange coil located within the conditioned space, outdoor heat exchange coil located outside of the conditioned space and a desuperheat exchange means;

transferring heat between the indoor coil and the conditioned space by passing ambient air over the indoor coil;

storing heat transferred between the indoor coil of a multifluid heat exchange means and/or the desuperheat exchange means and the outdoor coil by circulating a stored liquid between a heat storage facility and the second heat exchange coil of the multifluid heat exchange means located in thermal contact with the indoor coil, and/or selectively circulated through the liquid coil of the desuperheat exchange means; or storing "cool" transferred between the indoor coil and the outdoor coil by circulating a stored liquid between a cool storage facility and the second heat exchange coil of the multifluid heat exchange means located in thermal contact with the indoor refrigerant coil of the multifluid heat exchange means; and transferring stored heat/cool between the heat/cool storage facility and the conditioned space by circulating the stored liquid between the heat/cool storage facility and the second heat exchange coil of the multifluid heat exchanger and passing ambient air over said second heat exchange coil.

2. An integrated heat pump system for conditioned space heating or cooling by refrigerant to air heat exchange and simultaneous or separate heating or chilling of stored water by refrigerant to water heat exchange, heating the conditioned space or defrosting a refrigerant coil solely by heat from the stored hot water, and cooling the conditioned space from stored water, comprising:

a refrigerant compressor;

a desuperheater heat exchanger;

a reversing valve;

means connecting said desuperheater in series between the discharge side of said compressor and said reversing valve;

an outdoor refrigerant to air heat exchanger;

a multifluid indoor heat exchanger including at least first and second heat exchange coils, means thermally connecting said coils and means for forcing air over said coils;

first and second refrigerant expansion valves connected in series with said indoor and outdoor heat exchangers respectively;

means affording selective connection of said indoor and outdoor heat exchangers through said reversing valve to either side of said compressor; and means affording selective circulation of said stored water through said desuperheater, said indoor heat exchanger and/or both.

3. The system of claim 1 wherein said outdoor heat exchange means transfers heat to or from a refrigerant therein and the exterior ambient air.

4. The system of claim 1 wherein said outdoor heat exchange means transfers heat to or from a refrigerant therein and water.

5. The system of claim 4, wherein said water in said outdoor heat exchange means is provided by a closed loop system wherein the water is cooled or heated in the ground after passing through said heat exchanger means.

6. The system of claim 4, wherein said water in said outdoor heat exchange means is provided from an external source of water in a once-through system.

* * * * *